United States Patent
Ganiger et al.

(10) Patent No.: US 11,753,942 B1
(45) Date of Patent: Sep. 12, 2023

(54) FRANGIBLE AIRFOILS

(71) Applicant: General Electric Company, Schenectady, NY (US)

(72) Inventors: Ravindra Shankar Ganiger, Bangalore (IN); Hiranya Kumar Nath, Bangalore (IN); Kirti Arvind Petkar, Bangalore (IN); Viswanadha Gupta Sakala, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/717,272

(22) Filed: Apr. 11, 2022

(51) Int. Cl.
| | | |
|---|---|---|
| F01D 21/04 | (2006.01) |
| F01D 5/14 | (2006.01) |
| F04D 29/32 | (2006.01) |
| F01D 5/28 | (2006.01) |
| F01D 5/16 | (2006.01) |
| F01D 5/10 | (2006.01) |

(52) U.S. Cl.
CPC .............. *F01D 5/147* (2013.01); *F01D 5/10* (2013.01); *F01D 5/16* (2013.01); *F01D 5/28* (2013.01); *F01D 21/045* (2013.01); *F04D 29/324* (2013.01)

(58) Field of Classification Search
CPC ... F01D 5/147; F01D 5/10; F01D 5/16; F01D 5/28; F01D 21/045; F04D 29/324
See application file for complete search history.

(56) References Cited

U.S. PATENT DOCUMENTS

| | | | |
|---|---|---|---|
| 5,634,771 A | 6/1997 | Howard et al. | |
| 6,431,837 B1 | 8/2002 | Velicki | |
| 7,780,420 B1* | 8/2010 | Matheny | F01D 5/282 |
| | | | 416/241 R |
| 7,967,570 B2 | 6/2011 | Shi et al. | |
| 8,267,663 B2 | 9/2012 | Larose et al. | |
| 9,982,684 B2 | 5/2018 | Moricca | |
| 10,487,667 B2 | 11/2019 | Slavens et al. | |
| 10,920,607 B2* | 2/2021 | Jain | F01D 11/122 |
| 2008/0075601 A1* | 3/2008 | Giusti | F04D 29/324 |
| | | | 416/229 A |
| 2009/0028697 A1* | 1/2009 | Shi | F01D 5/147 |
| | | | 415/200 |
| 2015/0003995 A1 | 1/2015 | Xu | |
| 2015/0003997 A1 | 1/2015 | Mironets et al. | |
| 2017/0226867 A1* | 8/2017 | Nandula | F01D 21/045 |
| 2017/0370376 A1 | 12/2017 | Kray et al. | |
| 2019/0048730 A1 | 2/2019 | Subramanian et al. | |
| 2019/0136698 A1* | 5/2019 | Crall | F01D 5/284 |
| 2020/0116043 A1* | 4/2020 | Jain | F01D 21/045 |
| 2020/0116044 A1* | 4/2020 | Jain | F01D 21/045 |
| 2020/0116045 A1* | 4/2020 | Kray | F01D 11/12 |

* cited by examiner

*Primary Examiner* — Brian Christopher Delrue
(74) *Attorney, Agent, or Firm* — Dority & Manning, P.A.

(57) ABSTRACT

An airfoil for gas turbine engines is generally provided. The airfoil defines a span extending between a root and a tip, the airfoil further defines a chord at each point along the span extending between a leading edge and a trailing edge. Further, the airfoil includes at least one frangible airfoil portion, a residual airfoil portion adjacent to the at least one frangible airfoil portion, and one or more zones. The one or more zones may include a plurality of cavities, where at least one or more cavities of the plurality of cavities include inclusions, with the inclusions having one or more materials.

20 Claims, 7 Drawing Sheets

FRANGIBLE AIRFOILS

FIELD

The present subject matter relates generally to airfoils, and more particularly, to frangible airfoils for gas turbine engines including a plurality of inclusion-filled cavities.

BACKGROUND

Airfoils used in aircraft engines, such as fan blades of a gas turbine engine, can be susceptible to extreme loading events. For instance, a fan blade might strike a bird that is ingested into the engine, or a blade-out occurrence may arise wherein one of the fan blades is severed from a rotor disk. If the impact is large enough, a fan blade may break apart into one or more shards before traveling downstream through the engine.

Gas turbine engines, such as turbofans, generally include fan cases surrounding a fan assembly including the fan blades. The fan cases are generally configured to withstand an impact of the fan blades due to adverse engine conditions resulting in a failure mode, such as foreign object damage, hard rubs due to excessive or extreme unbalance or fan rotor oscillations, or fan blade liberation. However, such airfoil configurations generally increase the weight of the fan case, thereby increasing the weight of the engine and aircraft and reducing performance and efficiency.

Fan cases may include frangible structures, such as honeycombs or trench-filler material, configured to mitigate load transfer to and through the fan case. However, modifications to fan cases may not address issues relating to fan rotor unbalance following deformation or liberation of one or several airfoils such as fan blades.

Accordingly, a lighter, more cost-effective, and more easily controlled frangible airfoil would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
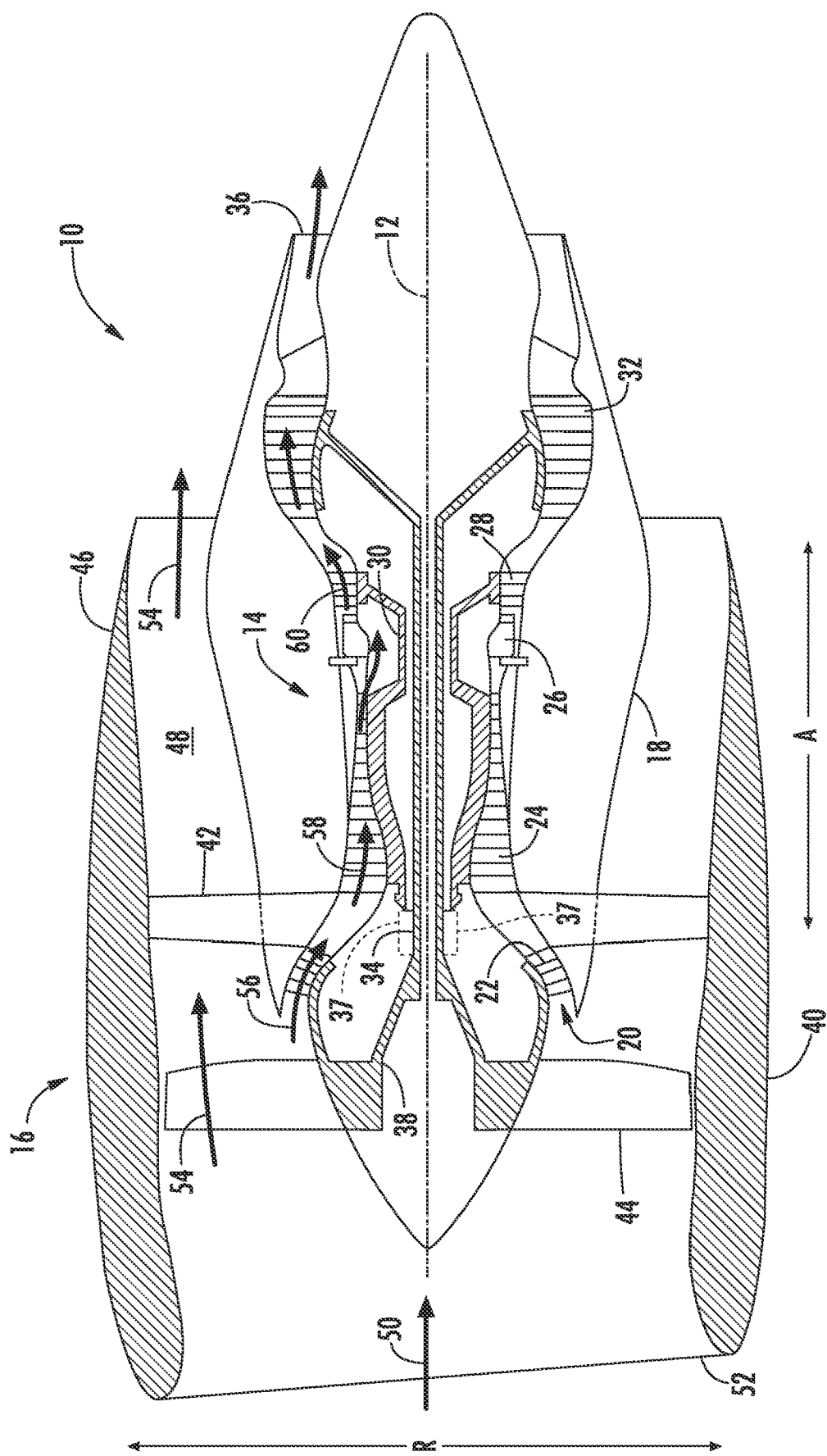
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

An airfoil for gas turbine engines is generally provided. The airfoil may define a span extending between a root and a tip, the airfoil further defining a chord at each point along the span extending between a leading edge and a trailing edge. Further, the airfoil may include at least one frangible airfoil portion, a residual airfoil portion adjacent to the at least one frangible airfoil portion, and one or more zones. The one or more zones may include a plurality of cavities, where at least one or more cavities of the plurality of cavities include inclusions, with the inclusions having one or more materials.

The embodiments generally described herein enable the airfoil to deform or detach at a desired span of the airfoil to mitigate load transfer to a surrounding casing. The embodiments generally provided herein may further enable the airfoil to deform or detach such that excessive or extreme unbalance of the fan rotor may be reduced following a failure event, such as airfoil liberation, foreign object damage (e.g., bird strikes, icing, etc.), or loss of lube or damper to a bearing assembly, as described more in depth below.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine 10 is a high-bypass turbofan jet engine, with the gas turbine engine 10 being shown having a longitudinal or central axis 12 extending therethrough along an axial direction A for reference purposes. The gas turbine engine 10 further defines a radial direction R extending from the central axis 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine 14 (indicated generally) and a fan section 16 positioned upstream thereof. The core gas turbine engine 14 generally includes an outer casing 18 that is substantially tubular and defines an annular inlet 20. In addition, the outer casing 18 may further enclose and support a low pressure (LP) compressor 22 for increasing the pressure of the air that enters the core gas turbine engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. High energy combustion products 60 are directed from the combustor 26 along the hot gas path of the gas turbine engine 10 to a high pressure (HP) turbine 28 for driving the HP compressor 24 via a high pressure (HP) shaft 30 or spool, and then to a low pressure (LP) turbine 32 for driving the LP compressor 22 and fan section 16 via a low pressure (LP) drive shaft 34 or spool that is generally coaxial with HP shaft 30. After driving each of turbines 28 and 32, the high energy combustion products 60 may be expelled from the core gas turbine engine 14 via an exhaust nozzle 36 to provide propulsive jet thrust.

Figure 2:
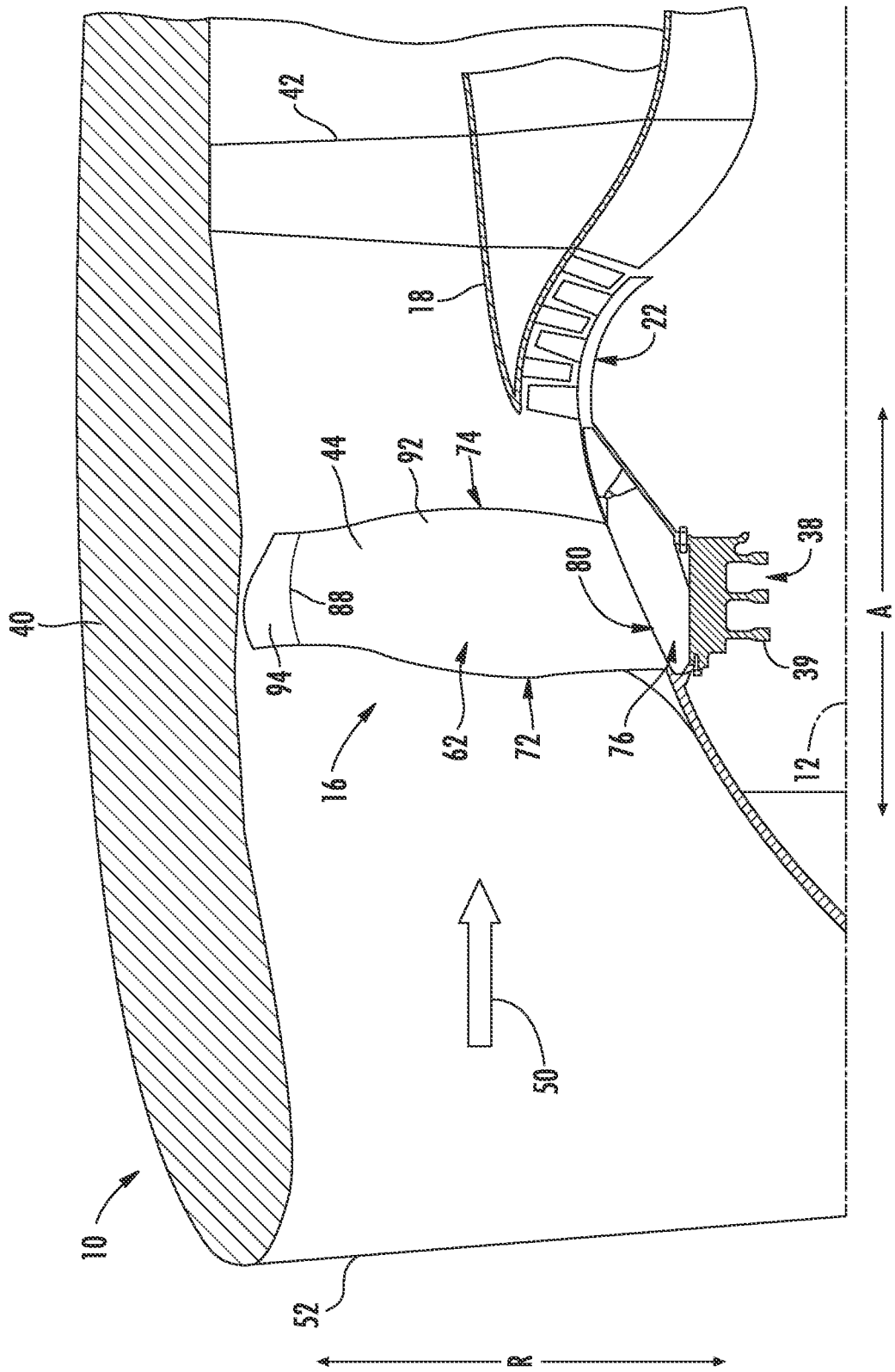
FIG. 2 illustrates a cross-sectional view of the fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 configured to be surrounded by an annular fan casing 40. In particular embodiments, the LP shaft 34 may be connected directly to the axial-flow fan rotor 38 or a fan rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required.

It should be appreciated by those of ordinary skill in the art that the annular fan casing 40 may be configured to be supported relative to the core gas turbine engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core gas turbine engine 14 so as to define a secondary, or bypass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow 54 (indicated by the arrow labeled as such) that moves through the bypass airflow conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the high energy combustion products 60 exit the combustor 26 and flow through the HP turbine 28. Thereafter, the high energy combustion products 60 flow through the LP turbine 32 and exit the exhaust nozzle 36 to provide thrust for the gas turbine engine 10.

Figure 3:
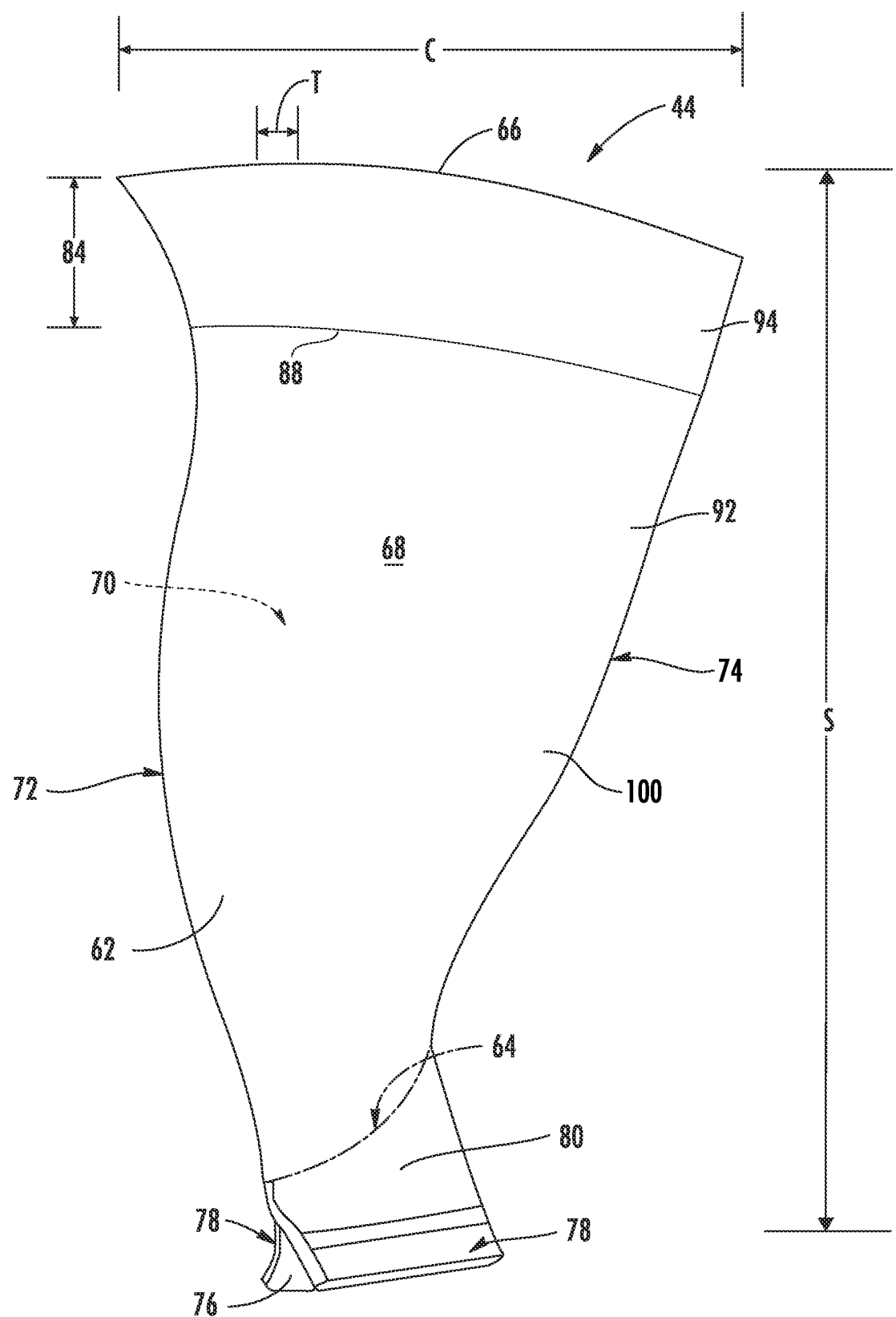
FIG. 3 illustrates a fan blade of the fan section of FIGS. 1 and 2 in accordance with aspects of the present subject matter, particularly illustrating at least one frangible airfoil portion and a residual airfoil portion.

Referring to FIGS. 2 and 3, exemplary airfoil 62 embodiments are provided in the context of one or more fan blades 44. Although the illustrated airfoils 62 are shown as part of the fan blades 44, it is understood that the following discussion of the airfoil 62 may be equally applied to another airfoil embodiment, e.g., a stator vane or rotor blade of a compressor and/or turbine (see, e.g., the LP compressor 22, the HP compressor 24, the HP turbine 28, and the LP turbine 32 of FIG. 1). As shown, each fan blade 44 extends radially outwardly along a span S from a root 64 to a tip 66. A pressure side 68 and a suction side 70 of the airfoil 62 extend from a leading edge 72 to a trailing edge 74 and between the root 64 and tip 66 along the span S. Further, it should be recognized that airfoil 62 may define a chord C at each point along the span S between the root 64 and the tip 66. The chord C may vary along the span of the airfoil 62. For instance, in the depicted embodiment, the chord C increases along the span S toward the tip 66. Though, in other embodiments, the chord C may be approximately constant throughout the span S or may decrease from the root 64 to the tip 66.

As shown particularly in FIG. 3, the airfoil 62 may define a thickness T extending between the pressure side 68 and the suction side 70 at each point along the span S. In certain embodiments, the thickness T may be approximately constant throughout the span S of the airfoil 62. In other embodiments, the airfoil 62 may define a variable thickness T between the root 64 and the tip 66. For instance, the thickness T may generally decrease along the span S toward the tip 66. Additionally, the airfoil 62 may define an approximately constant thickness T along the chord C at each point along the span S. Or, in other embodiments, at least one point along the span S of the airfoil 62 may define a variable thickness T along the chord C. For instance, the airfoil 62 may define a maximum thickness at a position along the chord C at each point along the span S.

Optionally, each fan blade 44 includes an integral component having an axial dovetail 76 with a pair of opposed pressure faces 78 leading to a transition section 80. When mounted within the gas turbine engine 10, as illustrated in FIG. 2, the axial dovetail 76 is disposed in a dovetail slot of the fan rotor disk 39, thereby attaching the fan blades 44 to the fan rotor 38.

The airfoil 62 may be configured to fracture, break, or liberate under certain conditions at approximately one or more fusion lines 88 up to the tip 66 (e.g., the at least one frangible airfoil portion 94) following a loading or impact upon the airfoil 62. For example, the airfoil 62 configured as the fan blade 44 within the fan casing 40 or nacelle of the gas turbine engine 10 (FIG. 1) may be configured to detach, decouple, deform, break, or liberate the at least one frangible airfoil portion 94 of the airfoil 62 above the one or more fusion lines 88. In one non-limiting example, the at least one frangible airfoil portion 94 of the airfoil 62 may be defined as the difference in spanwise dimensions of the at least one frangible airfoil portion 94 and a residual airfoil portion 92.

As such, the at least one frangible airfoil portion 94 may be positioned radially outward from the one or more fusion lines 88 to have a reduced bending stiffness such that the at least one frangible airfoil portion 94 may break-off or bend during a failure mode of the airfoil 62. For example, the embodiments generally shown and described herein may enable a controlled and consistent failure of the airfoil 62, such as a fan blade 44, following a failure and/or substantial unbalance event, such as a hard rub against a surrounding fan case. Events generating substantial unbalance in the fan rotor 38 and/or LP shaft 34 may include, but are not limited to, foreign object damage (e.g., bird strikes, ice ingestion, other debris, etc.) or fan blade 44 detachment. Detaching or decoupling the at least one frangible airfoil portion 94 may reduce undesired unbalance or vibrations as the fan rotor 38 and/or LP shaft 34 continue to rotate.

Referring specifically to FIG. 3, in one non-limiting embodiment, the at least one frangible airfoil portion 94 may extend from the tip 66 along at least 10% of the span S towards the root 64. For instance, the at least one frangible airfoil portion 94 may define a frangible height 84 extending from the tip 66 along at least 10% of the span S, such as along at least 15% but less than about 90% of the span S, towards the root 64. In other embodiments, the at least one frangible airfoil portion 94 may be defined within approximately 10% to approximately 50% of the total span S from the tip 66. The frangible height 84 may additionally and/or alternatively refer to a width of the at least one frangible airfoil portion 94, as measured from an outside edge of the airfoil 62. It should be recognized that the at least one frangible airfoil portion 94 may extend along the frangible height 84 equal to approximately the same percentage of the span S along the chord C. Though in other embodiments, the frangible height 84 may extend along a variable percentage of the span S along the fusion line 88, as described below. It should be recognized that the at least one frangible airfoil portion 94 may extend along any desirable span S of the airfoil 62 from the tip 66.

Referring generally to additional embodiments of an exemplary airfoil 62 as shown in FIGS. 4, 5, 6, and 7, the airfoil 62 defines the span S extending between the root 64, the tip 66, the airfoil 62 further defining the chord C at each point along the span extending between the leading edge 72 and the trailing edge 74. The airfoil 62 additionally includes at least one frangible airfoil portion 94, the residual airfoil portion 92 adjacent to the at least one frangible airfoil portion 94, and one or more zones Z. Additionally, at least one of the one or more zones Z may further include a plurality of cavities 102, where at least one or more cavities of the plurality of cavities 102 include inclusions 106. In some exemplary embodiments, the inclusions 106 include one or more materials 108. As used herein, the term "zone" refers to an area having a particular characteristic, purpose, or use.

The airfoil 62 may additionally include a core 100 including a functionally graded material. The core 100 and, more specifically, the functionally graded material may include a parent material elasticity. Functionally graded materials (FGM) have continuous variation of material properties from one surface to another unlike a composite which has stepped (or discontinuous) material properties. The gradation of properties in a functionally graded material reduces the thermal stresses, residual stresses and stress concentrations found in traditional composites. Functionally graded materials may be fabricated in any manner, including chemical vapor deposition, powder metallurgy, self-propagating high temperature synthesis, and plasma spraying.

The functionally graded material of the core 100 may extend throughout the entirety of the airfoil 62, stretching across multiple zones of the one or more zones Z. Likewise, the core 100 may extend continuously across the at least one frangible airfoil portion 94 and the residual airfoil portion 92. However, the core 100 may alternatively be discontinuous and break at one or more the fusion lines 88, e.g., where the at least one frangible airfoil portion 94 meets the residual airfoil portion 92.

Further, as mentioned previously, the one or more zones Z may further include the plurality of cavities 102, e.g., a first plurality of cavities 110, where at least one or more cavities of the plurality of cavities 102 have inclusions 106. In some exemplary embodiments, the inclusions 106 may include one or more materials 108. The inclusions 106 may further have an inclusion elasticity, where a ratio of the inclusion elasticity to the parent material elasticity is between about 0.5 to about 1.5. The inclusion elasticity may be based on a combination of the one or more materials 108 within the inclusions 106. Each of the one or more zones Z may include the plurality of cavities 102 with inclusions 106, where the inclusions 106 within each of the plurality of cavities 102 include varying materials from the one or more materials 108, as will be discussed more in depth below.

The plurality of cavities 102 may help define the one or more stress paths within the one or more zones Z, the at least one frangible airfoil portion 94, and/or the residual airfoil portion 92. More specifically, the inclusions 106 and/or lack thereof within the plurality of cavities 102 may define the one or more stress paths within each of the one or more zones Z. In some embodiments, the one or more stress paths may further correlate with the one or more fusion lines 88 such that the plurality of cavities 102 along the one or more fusion lines 88 have inclusions 106 with a lower inclusion elasticity. For example, the one or more materials 108 may be used alone or in combination with other materials to fill at least some cavities in the plurality of cavities 102. The materials 108 in the plurality of cavities 102, or lack thereof, may help determine the physical characteristics (in particular, the physical characteristics related to frangibility) of the inclusions 106 in the at least one or more zones Z that the one or more materials 108 are used in.

The residual airfoil portion 92 is generally adjacent to the at least one frangible airfoil portion 94 at one or more fusion lines 88. In an exemplary embodiment, the one or more zones Z of the airfoil 62 may also include more than one plurality of cavities 102, as will be discussed more in depth below. In some embodiments, at least one or more cavities of a second plurality of cavities 120 may also have inclusions 106 that include a combination of the one or more materials 108. The second plurality of cavities 120 may also have an inclusion elasticity, e.g., a second inclusion elasticity, based on the combination of the one or more materials 108 used within the inclusions 106 of the second plurality of cavities 120.

Figure 4:
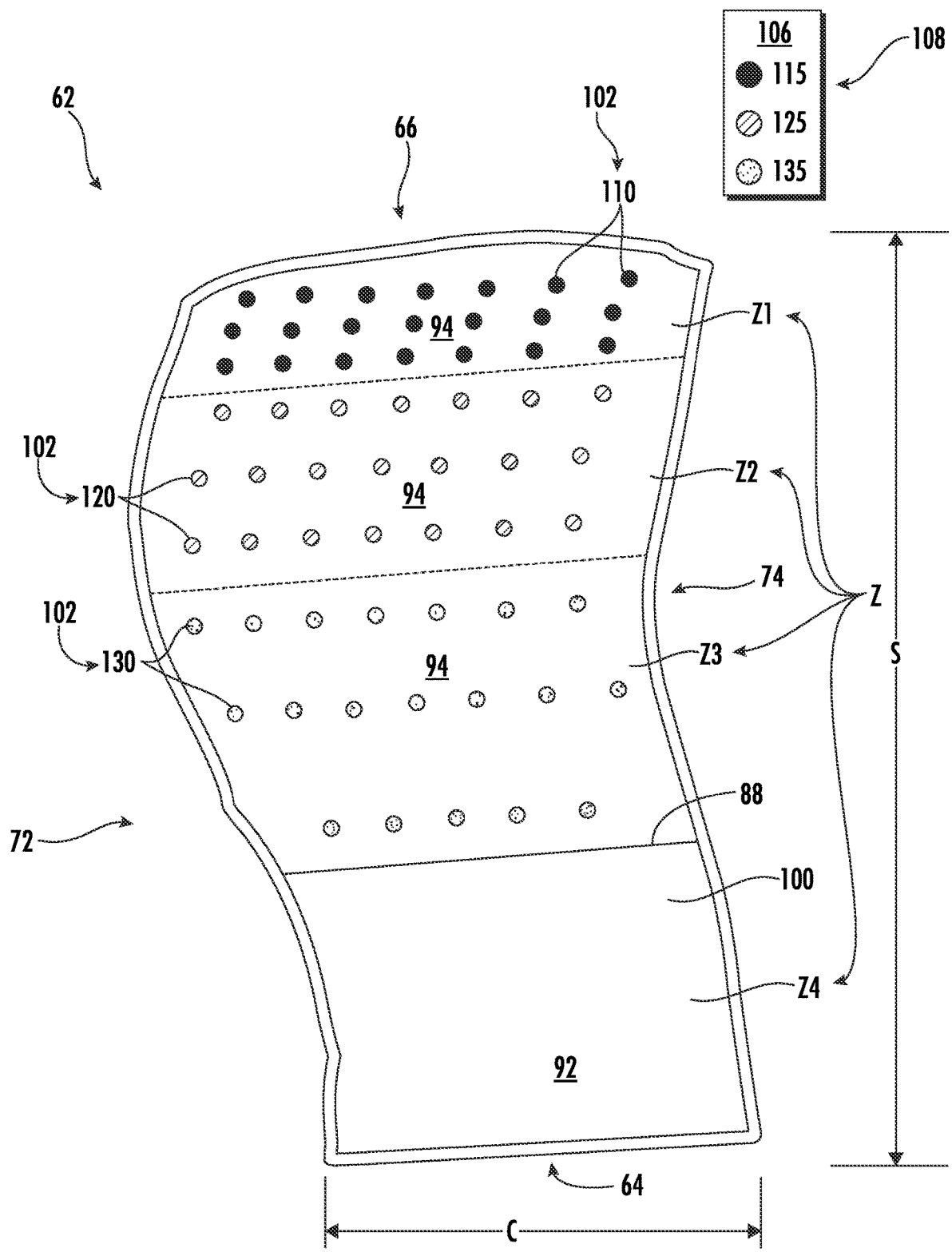
FIG. 4 illustrates one embodiment of the airfoil in accordance with aspects of the present subject matter, particularly illustrating the airfoil divided into horizontal zones, with each zone including a plurality of cavities with different materials.
Figure 5:
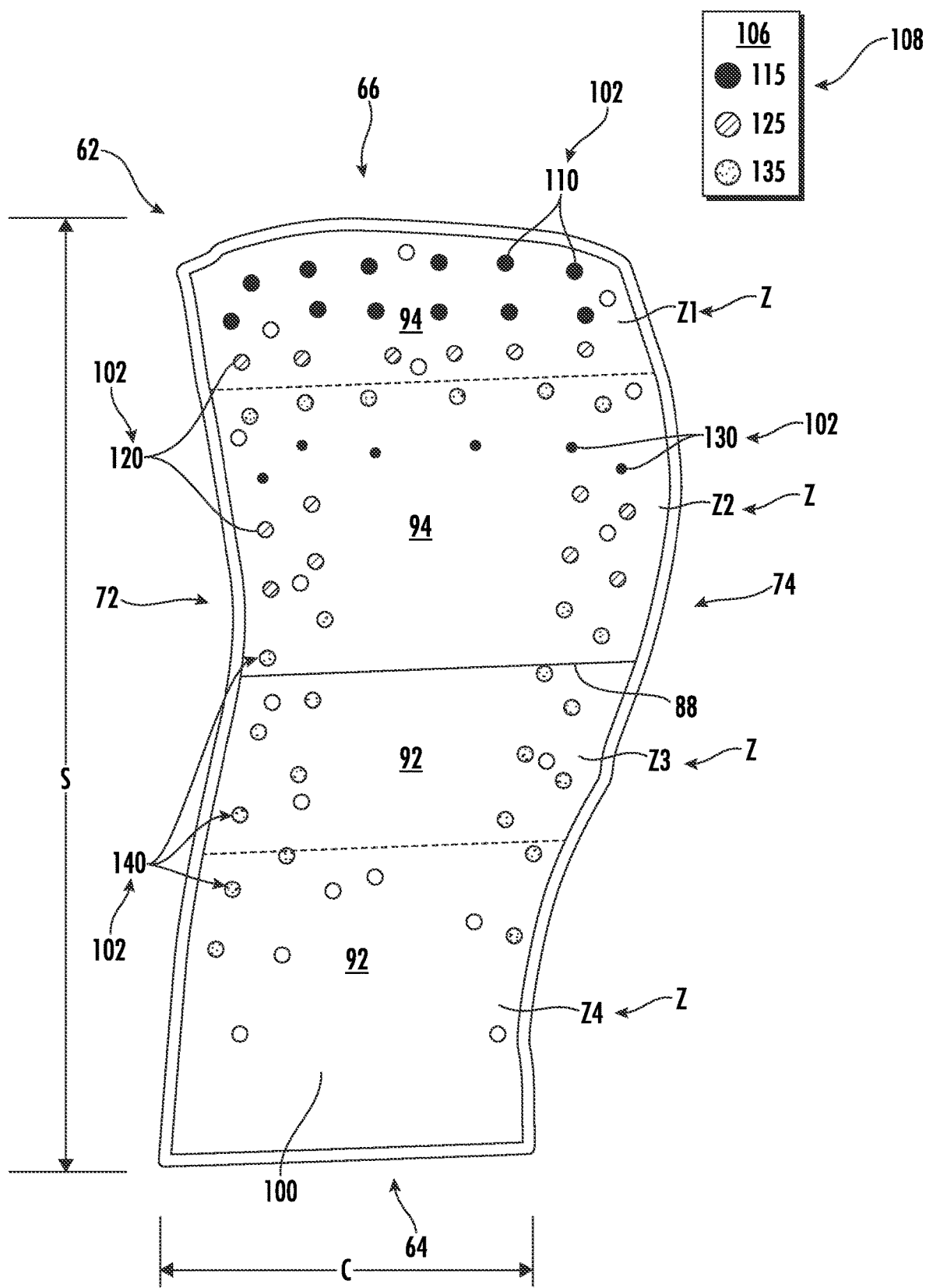
FIG. 5 illustrates another embodiment of the airfoil accordance with aspects of the present subject matter, particularly illustrating the airfoil divided into multiple zones, with a plurality of cavities along the outer span, the leading edge, and the trailing edge.

Referring more specifically to FIG. 4, an embodiment of the airfoil 62 with more than one plurality of cavities 102 is shown. The plurality of cavities 102 depicted includes a first plurality of cavities 110, the second plurality of cavities 120, and a third plurality of cavities 130 spanning across the airfoil 62. Each of the plurality of cavities 102 is grouped according to material combinations. The depicted embodiment shows the first plurality of cavities 110 with a solid fill, as denoted in the legend of FIG. 4, which represents a first material combination 115. The second plurality of cavities 120 are shown with a diagonally striped fill, which represents a second material combination 125. The third plurality of cavities 130 are shown with a dotted fill, representing a third material combination 135. Each of the first material combination 115, the second material combination 125, and the third material combination 135 may be different mixtures of the one or more materials 108. However, it will be appreciated that each of the first material combination 115, the second material combination 125, and the third material combination 135 may additionally and/or alternatively only be a single material of the one or more materials 108.

Further, in any of the depicted embodiments in FIGS. 4, 5, 6, and 7, the one or more materials 108 may be combined and/or mixed in any manner such that the one or more materials 108 help define the one or more stress paths for the one or more zones Z. Therefore, where a specific material combination is illustrated in the figures, another material in the one or more materials 108 may be substituted or added to achieve the same characteristics as the original material.

More specifically, the one or more materials 108 may each include at least one of ceramic materials, viscous-elastic materials, and metal materials. The ceramic materials may include silicon carbide. In some embodiments, the ceramic materials may additionally and/or alternatively include carbon nanotubes which may be impregnated with graphene and/or silicon carbide and graphene. The viscous-elastic materials may include aluminum, nickel, titanium, and/or alloys thereof. Further, the viscous-elastic materials may additionally and/or alternatively include shape memory alloy. The metal materials may include titanium, steel, Inconel, etc. and/or variations thereof. As mentioned above, each of the first material combination 115, the second material combination 125, and the third material combination 135 may have inclusions 106 with different mixtures of the one or more materials 108. For example, the first material combination 115 may be only viscous-elastic materials; the second material combination 125 may include ceramic and viscous-elastic materials; and the third material combination 135 may only include metal materials. It will be appreciated that any mixture of the one or more materials 108 may be contemplated herein.

The cavities in the plurality of cavities 102 may further have one or more variable shapes, in additional embodiments. For example, in certain embodiments, any or all of the plurality of cavities 102 may have a shape such as a circle, an ellipse, a rectangle, a square, and/or any combination thereof. The shape may further help the plurality of cavities 102 define the one or more stress paths within the airfoil 62, e.g., by altering the volume of inclusions 106 that a cavity in the plurality of cavities 102 can hold.

Further, the one or more of the zones Z and plurality of cavities 102 may be arranged in any manner within the airfoil 62. The one or more zones Z may be arranged horizontally (e.g., FIG. 4), vertically (not shown), and/or diagonally (e.g., FIG. 6). The one or more zones Z may further be grouped to form the at least one frangible airfoil portion 94 and/or the residual airfoil portion 92. For example, the at least one frangible airfoil portion 94 may extend along at least part of the tip 66. More specifically, the at least one frangible airfoil portion 94 may extend along the span S from the tip 66 towards the root 64 of the airfoil 62 (e.g., FIG. 4). In some embodiments, the at least one frangible airfoil portion 94 may extend along the span S from the tip 66 towards the root 64 for about 15%, about 20%, about 30%, about 40%, about 50%, about 60%, about 70%, about 80%, and/or about 90% of the total length of the span S. In other embodiments, the at least one frangible airfoil portion 94 may extend along an outer portion of the span S (e.g., FIG. 5). In yet other embodiments, the at least one frangible airfoil portion 94 may extend along at least one of the leading edge 72 and the trailing edge 74.

In certain non-limiting embodiments, the inclusions 106 within the filled plurality of cavities 102, e.g., the at least one cavity of the plurality of cavities 102 with inclusions 106, may have a density of between about 1% volume to about 100% volume of the plurality of cavities 102, with 100% representing a cavity that is substantially entirely filled with the inclusions 106. In some specific embodiments, for example, the inclusions 106 of the filled cavities may be from about 1% volume to less than about 10% volume capacity of an empty cavity of the plurality of cavities 102. In other embodiments, the inclusions 106 of the filled cavities may be about 10% volume to about 20% volume capacity of the empty cavity of the plurality of cavities 102. In yet other embodiments, the inclusions 106 of the filled cavities may be greater than about 20% capacity of the empty cavity of the plurality of cavities 102. As used herein, "density ratio" or "density" refers to the density of the inclusions 106 within the plurality of cavities 102. Also as used herein, the term "X% volume" refers to the percentage of the volume of the inclusion, e.g., the volume of the combination of the one or more materials 108, with respect to the volume capacity within a singular empty cavity of the plurality of cavities 102.

These specific densities recited may be included in combination with any of the configurations of one or more of the zones Z and plurality of cavities 102 described above. For example, where the at least one frangible airfoil portion 94 extends along at least part of the tip 66, each of the inclusions 106 may be about 1% to about 10% volume of the plurality of cavities 102. In another example, e.g., where the at least one frangible airfoil portion 94 extends along an outer portion of the span S, each of the inclusions 106 may be about 10% to about 25% of the plurality of cavities 102. In still further embodiments, the at least one frangible airfoil portion 94 may extend along at least one of the leading edge 72 and the trailing edge 74 (e.g., FIG. 7), and the inclusions 106 may be about 20% to about 75%, such as between about 25% to about 80%, about 30% to about 85%, about 40% to about 90%, about 50% to about 95%, or about 60% to about 99% of the plurality of cavities 102.

Referring specifically to FIG. 4, each of the plurality of cavities 102 may correspond to a specific zone of the one or more zones Z. Each of the one or more zones Z are shown separated by a dashed line. For example, as depicted, the first plurality of cavities 110 is within a first zone Z1, the second plurality of cavities 120 is within a second zone Z2, and the third plurality of cavities 130 is within a third zone Z3. Collectively, the first zone Z1, the second zone Z2, and the third zone Z3 make up the at least one frangible airfoil portion 94. A fourth zone Z4 is also shown in FIG. 4, but without any cavities. In the depicted embodiment, the fourth zone Z4 is the residual airfoil portion 92 of the airfoil 62, as defined by the solid line, e.g., the one or more fusion lines 88. Although the fourth zone Z4 is shown without any cavities, some embodiments of the residual airfoil portion 92 may also include at least one of the plurality of cavities 102, which may or may not be filled with the inclusions 106.

It will be appreciated that in some embodiments, the plurality of cavities may span across more than one of the one or more zones Z. Referring now specifically to the embodiment shown in FIG. 5, the at least one frangible airfoil portion 94 is shown as including the first zone Z1 and the second Z2. The at least one frangible airfoil portion 94 meets the residual airfoil portion 92 at the fusion line 88 (shown as a solid line) between the second zone Z2 and the third zone Z3. The residual airfoil portion 92 is shown as including both the third zone Z3 and the fourth zone Z4. Each of the one or more zones Z are shown separated by a dashed line. In the illustrated embodiment, the first zone Z1 includes cavities filled with the first material combination 115 (shown with the solid fill), corresponding to the first plurality of cavities 110, as well as the second plurality of cavities 120 with the second material combination 125. The second zone Z2 includes the second plurality of cavities 120 with the second material combination 125 (striped diagonal fill), the third plurality of cavities 130 with the first material combination 115 (but shown smaller to indicate a lower percent volume of inclusions 106), and the fourth plurality of cavities 140 with the third material combination 135 (dotted fill). The third zone Z3 and the fourth zone Z4 in the illustrated embodiment primarily include only the fourth plurality of cavities 140.

Figure 6:
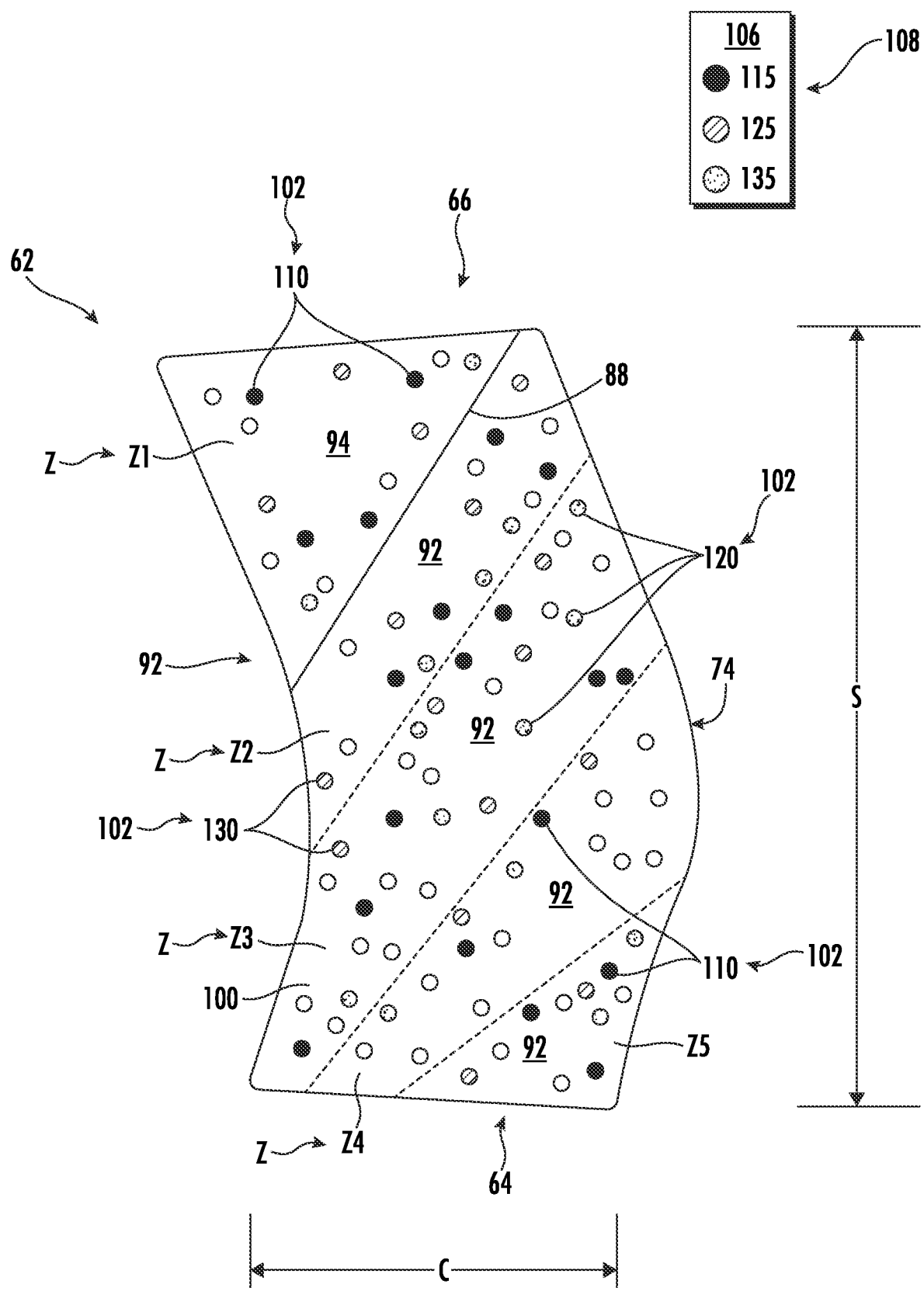
FIG. 6 illustrates another embodiment of the airfoil in accordance with aspects of the present subject matter, particularly illustrating the airfoil divided into multiple diagonal zones.

Referring now to FIG. 6, an embodiment of the airfoil 62 is shown with one or more zones Z extending diagonally, such as the first zone Z1, the second zone Z2, the third zone Z3, the fourth zone Z4, and a fifth zone Z5. Each of the one or more zones Z are shown separated by a dashed line. Similar to the embodiment depicted in FIG. 5, the plurality of cavities 102 are shown extending throughout the airfoil 62. In FIG. 6, however, the at least one frangible airfoil portion 94 is shown as including the first zone Z1. The solid lines representing the one or more fusion lines 88 define the at least one frangible airfoil portion 94. Also as illustrated, the residual airfoil portion 92 may also include one or more zones Z, extending across the second zone Z2, the third zone Z3, the fourth zone Z4, and the fifth zone Z5. Each of the one or more zones Z are shown separated by a dashed line. Additionally, each of the first zone Z1, the second zone Z2, the third zone Z3, the fourth zone Z4, and the fifth zone Z5 may include any number of the plurality of cavities 102, with the plurality of cavities 102 within each zone of the one or more zones Z being tailored to form a specific stress path. For example, the specific material combinations within the second zone Z2, the third zone Z3, the fourth zone Z4, and/or the fifth zone Z5 may be more elastic and/or have internal damping mechanisms to accommodate for fluttering and/or chattering of the gas turbine engine 10. In other embodiments, the at least one frangible airfoil portion 94 may also include the second zone Z2, the third zone Z3, and/or the fourth zone Z4. The specific combination of the one or more materials 108 allows for the airfoil 62 to be tailored to suit the needs of the gas turbine engine 10.

Figure 7:
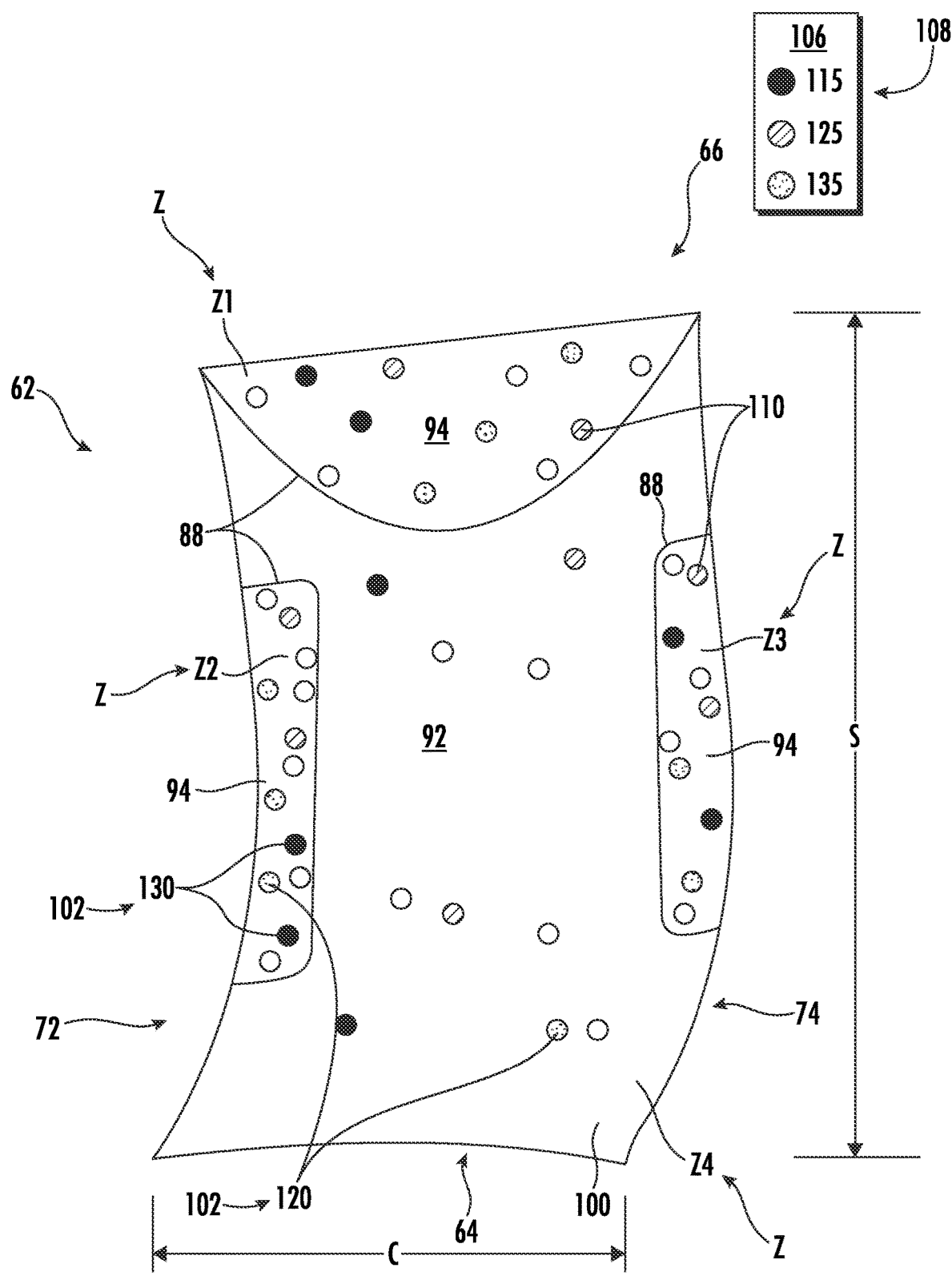
FIG. 7 illustrates another embodiment of the airfoil in accordance with aspects of the present subject matter, particularly illustrating the airfoil divided into multiple discrete zones, particularly around along the outer span, the leading edge, and the trailing edge.

Referring to the embodiment of FIG. 7, the at least one frangible airfoil portion 94 is shown with multiple discrete frangible portions, e.g., the first zone Z1, the second zone Z2, and the third zone Z3. The one or more fusion lines 88 correspond to the different zones of the one or more zones Z. The residual airfoil portion 92 is shown as a single portion of the airfoil 62, zone Z4. The plurality of cavities 102 may be tailored to define the one or more stress paths for the at least one frangible airfoil portion 94, and, even more specifically, may be used to tailor the one or more fusion lines 88. For example, in the illustrated figure, the one or more fusion lines 88 are curved rather than straight. The plurality of cavities 102 may be placed in such a manner as to define one or more fusion lines 88 that are curved, rather than straight. Additionally, at least one or more cavities of the plurality of cavities 102 along the one or more fusion lines 88 may have inclusions 106 including a combination of the one or more materials 108 that is less elastic (e.g., more brittle) and therefore more susceptible to breakage.

Further, while reference may be made herein referring only to the first plurality of cavities 110, the second plurality of cavities 120, the third plurality of cavities 130, and/or the fourth plurality of cavities 140, the airfoil 62 described herein may be adapted to incorporate any number of plurality of cavities 102, with any combination of the one or more materials 108. For example, the airfoil 62 may include a fifth plurality of cavities, or a sixth plurality of cavities and with a fourth material, a fifth material, and/or a sixth material. Additionally and/or alternatively, some of the cavities in a plurality of cavities may be unfilled, e.g., empty and/or without any of the one or more materials 108.

In another exemplary embodiment of the airfoil 62, the airfoil 62 defines the span S extending between the root 64, the tip 66, the airfoil 62 further defining the chord C at each point along the span extending between the leading edge 72 and the trailing edge 74. The airfoil 62 further includes a functionally graded material (e.g., core 100) with a parent material elasticity and one or more zones Z. The one or more zones Z may include a plurality of cavities 102 where at least one of the plurality of cavities 102 has an inclusion with an inclusion elasticity between 0.5 to 1.5 the parent material elasticity. The one or more zones Z further include at least one frangible airfoil portion 94 and a residual airfoil portion 92 adjacent to the at least one frangible airfoil portion 94 at one or more fusion lines 88.

As mentioned previously, the inclusions 106 may be greater than about 20% volume of the at least one of the plurality of cavities 102. In some examples of this embodiment, a ratio of the inclusion elasticity to the parent material elasticity may be between about 0.5 to about 1 (e.g., where the inclusion elasticity and the parent material elasticity are the same), such as between about 0.5 to about 0.75, and/or such as between about 0.75 to about 1.

In additional and/or alternative embodiments, the inclusions 106 may be between about 10% to about 20% of the at least one of the plurality of cavities 102. The ratio of the inclusion elasticity to the parent material elasticity may be between about 0.5 to about 1.2, such as between about 0.75 to about 1.2, such as between about 0.75 to about 1, and/or such as between about 1 to about 1.2.

Further, in other embodiments, the inclusions 106 may be less than about 10% of the at least one of the plurality of cavities 102. For example, the inclusion may be about 9%, about 7.5%, about 6%, about 5%, about 3%, and/or about 1%. In such embodiments, the ratio of the inclusion elasticity to the parent material elasticity may be between about 0.5 to about 1.5 the parent material elasticity, such as between about 1 to about 1.5 the parent material elasticity.

Additionally, in some embodiments, the airfoil 62 may be part of a gas turbine engine 10. The gas turbine engine 10 may define the central axis 12 and include an engine shaft extending along the central axis 12, a compressor (e.g., the HP compressor 24) attached to the engine shaft and extending radially about the central axis 12, a combustor 26 positioned downstream of the compressor to receive a compressed fluid therefrom, a turbine mounted on the engine shaft downstream of the combustor 26 to provide a rotational force to the compressor, and a plurality of airfoils operably connected to the engine shaft, each of the plurality of airfoils defining a span S extending between a root 64 and a tip 66. Each airfoil 62 may include a functionally graded material comprising a parent material elasticity and one or more zones Z. The one or more zones Z may include a plurality of cavities 102, where at least one of the plurality of cavities 102 has inclusions 106 with an inclusion elasticity between 0.5 to 1.5 parent material elasticity. The one or more zones Z may further include at least one frangible airfoil portion 94 and a residual airfoil portion 92 adjacent to the at least one frangible airfoil portion 94 at one or more fusion lines 88. Although the airfoil 62 is shown as a fan blade of the gas turbine engine 10, it will be appreciated that the airfoil 62 may additionally and/or alternatively refer to any other components of the gas turbine engine 10.

In general, the exemplary embodiments of the airfoil 62 described herein may be manufactured or formed using any suitable process. However, in accordance with several aspects of the present subject matter, the airfoil 62 may be formed using an additive manufacturing process, such as a 3D printing process. The use of such a process may allow the airfoil 62 to be formed integrally, as a single monolithic component, or as any suitable number of sub-components. For example, one or more of the at least one frangible airfoil portion 94 or the residual airfoil portion 92 may be formed using an additive-manufacturing process. In particular, the plurality of cavities 102 may be formed in the at least one frangible airfoil portion 94 via an additive-manufacturing process. Forming the plurality of cavities 102 via additive manufacturing may allow the plurality of cavities 102 to be integrally formed and include a variety of features not possible when using prior manufacturing methods. For example, the additive manufacturing methods described herein enable the manufacture of plurality of cavities 102 having any suitable size and shape with one or more configurations, some of these novel features are described herein. Further, additive manufacturing may allow the airfoil 62 to be formed where the at least one frangible airfoil portion 94 has a lower bending stiffness than the residual airfoil portion 92.

As used herein, the terms "additive manufacturing," "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laser jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein may be constructed entirely by additive manufacturing processes, it should be appreciated that in alternate embodiments, all or a portion of these components may be formed via casting, machining, and/or any other suitable manufacturing process.

Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the airfoil 62, the residual airfoil portion 92, the at least one frangible airfoil portion 94, and/or internal passageways such as an internal cavity 82, openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

While the present disclosure is not limited to the use of additive manufacturing to form these components generally, additive manufacturing does provide a variety of manufacturing advantages, including ease of manufacturing, reduced cost, greater accuracy, etc. In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above may enable much more complex and intricate shapes and contours of the airfoil 62 described herein. For example, such components may include thin additively manufactured layers and unique passageways, such as the plurality of cavities 102. In addition, the additive manufacturing process enables the manufacture of a single component having different materials such that different portions of the component may exhibit different performance characteristics. The successive, additive nature of the manufacturing process enables the construction of these novel features. As a result, the airfoil 62 described herein may exhibit improved performance and reliability.

It will also be appreciated that the plurality of cavities 102 described herein may be used with airfoils made of metal or composite. In particular, the inclusions 106 within the plurality of cavities 102 may be tailored to create flexibility at desired regions to meet a variety of design criteria.

Further aspects are provided by the subject matter of the following clauses:

An airfoil defining a span extending between a root and a tip, the airfoil further defining a chord at each point along the span extending between a leading edge and a trailing edge, the airfoil comprising: at least one frangible airfoil portion; a residual airfoil portion adjacent to the at least one frangible airfoil portion; and one or more zones, wherein the one or more zones further comprise a plurality of cavities, wherein at least one cavity of the plurality of cavities comprises inclusions, and wherein the inclusions comprise one or more materials.

The airfoil of any of the preceding clauses, wherein the one or more materials comprise at least one of ceramic materials, viscous-elastic materials, and metal materials.

The airfoil of any of the preceding clauses, the airfoil further comprising: a core comprising a functionally graded material, the functionally graded material comprising a parent material elasticity.

The airfoil of any of the preceding clauses, wherein the inclusions 106 comprise an inclusion elasticity, and wherein a ratio of the inclusion elasticity to the parent material elasticity is between about 0.5 to about 1.5.

The airfoil of any of the preceding clauses, wherein the at least one airfoil portion extends along at least part of the tip, and wherein each of the inclusions 106 comprise about 1% volume to about 10% volume of the at least one cavity of the plurality of cavities.

The airfoil of any of the preceding clauses, wherein the at least one frangible airfoil portion extends along an outer portion of the span, and wherein each of the inclusions comprise about 10% volume to about 20% volume of the at least one cavity of the plurality of cavities.

The airfoil of any of the preceding clauses, wherein the at least one frangible airfoil portion extends along at least one of the leading edge and the trailing edge, and wherein the inclusions 106 comprise about 20% volume to about 99% volume of the at least one cavity of the plurality of cavities.

The airfoil of any of the preceding clauses, wherein the plurality of cavities comprise a shape of one or more of the following: circle, an ellipse, a rectangle, and a square.

An airfoil defining a span extending between a root and a tip, the airfoil further defining a chord at each point along the span extending between a leading edge and a trailing edge, the airfoil comprising: a functionally graded material comprising a parent material elasticity; and one or more zones, wherein at least one of the one or more zones comprise a plurality of cavities, wherein at least one of the plurality of cavities comprise inclusions, the inclusions comprising an inclusion elasticity between 0.5 to 1.5 the parent material elasticity, and wherein the one or more zones further comprise: at least one frangible airfoil portion; and a residual airfoil portion adjacent to the at least one frangible airfoil portion at one or more fusion lines.

The airfoil of any of the preceding clauses, wherein the inclusions comprise one or more materials.

The airfoil of any of the preceding clauses, wherein the one or more materials comprise at least one of ceramic materials, viscous-elastic materials, and metal materials.

The airfoil of any of the preceding clauses, wherein the inclusion comprises greater than about 20% volume of the at least one of the plurality of cavities.

The airfoil of any of the preceding clauses, wherein a ratio of the inclusion elasticity to the parent material elasticity is between about 0.5 to about 1.

The airfoil of any of the preceding clauses, wherein the inclusions comprise between about 10% to about 20% volume of the at least one of the plurality of cavities.

The airfoil of any of the preceding clauses, wherein a ratio of the inclusion elasticity to the parent material elasticity is between about 0.5 to about 1.2.

The airfoil of any of the preceding clauses, wherein the inclusions comprise less than about 10% volume of the at least one of the plurality of cavities.

A gas turbine engine defining a central axis, the gas turbine engine comprising: an engine shaft extending along the central axis; a compressor attached to the engine shaft and extending radially about the central axis; a combustor positioned downstream of the compressor to receive a compressed fluid therefrom; a turbine mounted on the engine shaft downstream of the combustor to provide a rotational force to the compressor; and a plurality of airfoils operably connected to the engine shaft, each of the plurality of airfoils defining a span extending between a root and a tip, each airfoil comprising: a functionally graded material comprising a parent material elasticity; and one or more zones, wherein at least one of the one or more zones comprise a plurality of cavities, wherein at least one of the plurality of cavities comprises inclusions, the inclusions comprising an inclusion elasticity between 0.5 to 1.5 parent material elasticity, and wherein the one or more zones further comprise: at least one frangible airfoil portion; and a residual airfoil portion adjacent to the at least one frangible airfoil portion at one or more fusion lines.

The gas turbine engine of any of the preceding clauses, wherein a ratio of the inclusion elasticity to the parent material elasticity is between about 0.5 to about 1.

The gas turbine engine of any of the preceding clauses, wherein a ratio of the inclusion elasticity to the parent material elasticity is between about 0.5 to about 1.2.

The gas turbine engine of any of the preceding clauses, wherein the inclusions comprise less than about 10% volume of the at least one of the plurality of cavities.

This written description uses exemplary embodiments to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a span extending between a root and a tip, the airfoil further defining a chord at each point along the span extending between a leading edge and a trailing edge, the airfoil comprising:
   at least one frangible airfoil portion;
   a residual airfoil portion adjacent to the at least one frangible airfoil portion; and one or more zones within the at least one frangible airfoil portion and within the residual airfoil portion,
   wherein the at least one frangible airfoil portion and the residual airfoil portion further comprise a plurality of cavities,
   wherein the plurality of cavities comprise inclusions, and
   wherein the inclusions comprise one or more materials.

2. The airfoil of claim 1, wherein the one or more materials comprise at least one of ceramic materials, viscous-elastic materials, and metal materials.

3. The airfoil of claim 1, the airfoil further comprising:
   a core comprising a functionally graded material, the functionally graded material comprising a parent material elasticity.

4. The airfoil of claim 3, wherein the inclusions comprise an inclusion elasticity, and wherein a ratio of the inclusion elasticity to the parent material elasticity is between 0.5 to 1.5.

5. The airfoil of claim 1, wherein the at least one frangible airfoil portion extends along at least part of the tip, and wherein the inclusions comprise 1% volume to 10% volume of the at least one cavity of the plurality of cavities.

6. The airfoil of claim 1, wherein the at least one frangible airfoil portion extends along an outer portion of the span, and wherein the inclusions comprise 10% volume to 20% volume of the at least one cavity of the plurality of cavities.

7. The airfoil of claim 1, wherein the at least one frangible airfoil portion extends along at least one of the leading edge and the trailing edge, and wherein the inclusions comprise 20% volume to 99% volume of the at least one cavity of the plurality of cavities.

8. The airfoil of claim 3, wherein the plurality of cavities comprise a shape of one or more of the following: circle, an ellipse, a rectangle, and a square.

9. An airfoil defining a span extending between a root and a tip, the airfoil further defining a chord at each point along the span extending between a leading edge and a trailing edge, the airfoil comprising:
   a functionally graded material comprising a parent material elasticity; and
   one or more zones comprising at least one frangible airfoil portion and a residual airfoil portion, wherein the at least one frangible airfoil portion and the residual airfoil portion further comprise a plurality of cavities, wherein the plurality of cavities comprise inclusions, the inclusions comprising an inclusion elasticity between 0.5 to 1.5 the parent material elasticity, and wherein the one or more zones further comprise:

the residual airfoil portion adjacent to the at least one frangible airfoil portion at one or more fusion lines, wherein the plurality of cavities define one or more stress paths within the one or more zones, the at least one frangible airfoil portion, and the residual airfoil portion.

10. The airfoil of claim 9, wherein the inclusions comprise one or more materials.

11. The airfoil of claim 10, wherein the one or more materials comprise at least one of ceramic materials, viscous-elastic materials, and metal materials.

12. The airfoil of claim 11, wherein the inclusions comprise greater than 20% volume of the at least one of the plurality of cavities.

13. The airfoil of claim 12, wherein a ratio of the inclusion elasticity to the parent material elasticity is between 0.5 to 1.

14. The airfoil of claim 9, wherein the inclusions comprise between 10% to 20% volume of the at least one of the plurality of cavities.

15. The airfoil of claim 14, wherein a ratio of the inclusion elasticity to the parent material elasticity is between 0.5 to 1.2.

16. The airfoil of claim 9, wherein the inclusions comprise less than 10% volume of the at least one of the plurality of cavities.

17. A gas turbine engine defining a central axis, the gas turbine engine comprising:

an engine shaft extending along the central axis;

a compressor attached to the engine shaft and extending radially about the central axis;

a combustor positioned downstream of the compressor to receive a compressed fluid therefrom;

a turbine mounted on the engine shaft downstream of the combustor to provide a rotational force to the compressor; and a plurality of airfoils operably connected to the engine shaft, each of the plurality of airfoils defining a span extending between a root and a tip, each of the plurality of airfoils comprising:

a functionally graded material comprising a parent material elasticity; and one or more zones comprising at least one frangible airfoil portion and a residual airfoil portion, wherein the at least one frangible airfoil portion and the residual airfoil portion further comprise a plurality of cavities, wherein of the plurality of cavities comprise inclusions, the inclusions comprising an inclusion elasticity between 0.5 to 1.5 parent material elasticity, and wherein the one or more zones further comprise:

the residual airfoil portion adjacent to the at least one frangible airfoil portion at one or more fusion lines.

18. The gas turbine engine of claim 17, wherein a ratio of the inclusion elasticity to the parent material elasticity is between 0.5 to 1.

19. The gas turbine engine of claim 17, wherein a ratio of the inclusion elasticity to the parent material elasticity is between 0.5 to 1.2.

20. The gas turbine engine of claim 17, wherein the inclusions comprise less than 10% volume of the at least one of the plurality of cavities.

* * * * *